United States Patent
Conchieri (10) Patent No.: US 8,359,868 B2
(45) Date of Patent: Jan. 29, 2013

(54) LOW BTU FUEL FLOW RATIO DUCT BURNER FOR HEATING AND HEAT RECOVERY SYSTEMS

(75) Inventor: John Anthony Conchieri, Greenfield Center, NY (US)

(73) Assignee: General Electric Company, Schenectady, NY (US)

( * ) Notice: Subject to any disclaimer, the term of this patent is extended or adjusted under 35 U.S.C. 154(b) by 1175 days.

(21) Appl. No.: 12/209,109

(22) Filed: Sep. 11, 2008

(65) Prior Publication Data

US 2010/0058764 A1   Mar. 11, 2010

(51) Int. Cl.
*F02C 2/00* (2006.01)
(52) U.S. Cl. .......... 60/772; 60/39.182; 122/7 B
(58) Field of Classification Search .......... 60/39.182, 60/39.5, 39.52, 39.55, 772, 773, 776, 806; 122/7 R, 7 B
See application file for complete search history.

(56) References Cited

U.S. PATENT DOCUMENTS

| | | | | |
|---|---|---|---|---|
| 4,706,612 A | * | 11/1987 | Moreno et al. | 122/7 R |
| 4,859,173 A | | 8/1989 | Davis, Jr. et al. | |
| 5,002,121 A | * | 3/1991 | von Erichsen | 165/100 |
| 5,267,434 A | * | 12/1993 | Termuehlen et al. | 60/39.182 |
| 5,299,601 A | * | 4/1994 | Koch | 137/875 |
| 5,461,853 A | * | 10/1995 | Vetterick | 60/783 |
| 5,628,183 A | * | 5/1997 | Rice | 60/39.182 |
| 5,727,379 A | * | 3/1998 | Cohn | 60/39.182 |
| 6,247,315 B1 | | 6/2001 | Marin et al. | |
| 2005/0268594 A1 | * | 12/2005 | Kurihara et al. | 60/39.182 |

OTHER PUBLICATIONS

E. Mazzi, et al., "Heat Recovery Steam Generators Supplementary Fired With Lean Gas;" Proceedings of 2000 International Joint Power Generation Conference, Miami Beach, Florida, Jul. 23-26, 2000; 9 pgs.
Eclipse RatioAir Burners Bulletin 115C, Jun. 2003, 2pgs. located at http://riveon.eclipsenet.com/parkstreet/public/ViewFile.aspx?aid=161531.
Coen Duct Burners for Cogeneration Systems brochure dated 1993.

* cited by examiner

*Primary Examiner* — Phutthiwat Wongwian
(74) *Attorney, Agent, or Firm* — Fletcher Yoder P.C.

(57) ABSTRACT

Duct burner systems include a primary duct configured to receive a primary flow stream of exhaust gases from an exhaust duct and a secondary duct configured to receive a secondary flow stream of exhaust gases from the exhaust duct. Primary and secondary variable geometry diverters may be configured to allow and restrict the primary and secondary flow streams, respectively. A combustion system may receive the secondary flow stream, combine it with at least one low BTU fuel source, combust for heating the secondary flow stream, and re-inject the heated secondary flow stream into the primary duct. A blower may be used to blow the secondary flow stream through the combustion system. In addition, a system controller may be used to control the stoichiometric flow ratio between the low BTU fuel flow source and the secondary flow stream by actuating the primary and secondary variable geometry diverters.

19 Claims, 5 Drawing Sheets

LOW BTU FUEL FLOW RATIO DUCT BURNER FOR HEATING AND HEAT RECOVERY SYSTEMS

BACKGROUND OF THE INVENTION

The present invention relates generally to duct burner systems used with gas turbines and heat recovery steam generation (HRSG) systems. More specifically, the invention relates to duct burner systems and processes capable of burning low BTU (British thermal unit) fuel sources where variable geometric features and flow controls are applied to optimize the stoichiometry of a combustible mixture.

Many steel refineries, gasification plants, and other facilities producing low BTU fuels also use HRSG systems for heating and power transmission. In some cases, burning a low BTU fuel instead of a natural gas or other common high BTU fuel source may be classified as using renewable energy and economic credits may be realized. In addition, in some cases, the low BTU fuels may not otherwise be useful as fuel sources. Therefore, using low BTU fuels for supplemental firing in an HRSG system may prove beneficial from both an operational and economic standpoint.

However, using low BTU fuels for supplemental firing in an HRSG system may also prove problematic for several reasons. For instance, customization of the firing equipment may be required to satisfy the physical and chemical properties of the fuel for adequate combustion within flammability limits. In addition, the stoichiometric flow ratio may typically be uncontrolled in such supplemental firing systems.

BRIEF DESCRIPTION OF THE INVENTION

In one embodiment, a system is provided. The system includes an exhaust duct configured to receive exhaust gases from a gas turbine. The system also includes a primary duct configured to receive a primary flow stream of the exhaust gases from the exhaust duct. The system further includes a secondary duct configured to receive a secondary flow stream of the exhaust gases from the exhaust duct. In addition, the system includes a primary variable geometry diverter configured to allow and restrict the primary flow stream into the primary duct. Further, the system includes a secondary variable geometry diverter configured to allow and restrict the secondary flow stream into the secondary duct. The system also includes a combustion system configured to combine the secondary flow stream with at least one low BTU fuel source, to combust the secondary flow stream, and to re-inject the heated secondary flow stream into the primary duct. The system further includes a blower configured to blow the secondary flow stream through the combustion system. In addition, the system includes a controller configured to control the stoichiometric flow ratio between the low BTU fuel source and the secondary flow stream by actuating the primary and secondary variable geometry diverters.

In another embodiment, a system is provided. The system includes a variable geometry diverter configured to operate in a path of exhaust gas from a gas turbine to a heat recovery steam generation system. The variable geometry diverter is configured to divide the path of exhaust gas into a primary exhaust path and a secondary exhaust path. The system also includes a combustion system configured to combine the exhaust gas in the secondary exhaust path with at least one low BTU fuel source, to combust the exhaust gas in the secondary exhaust path, and to re-inject the heated gas into the primary exhaust path.

In yet another embodiment, a method is provided. The method includes diverting gas between a primary duct and a secondary duct using a variable geometry diverter. A primary flow stream is diverted into the primary duct and a secondary flow stream is diverted into the secondary duct. The method also includes heating the secondary flow stream in a combustion system using a low BTU fuel to combust in the combustion system. The method further includes re-injecting the heated flow stream into the primary duct.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters are not exclusive of other parameters of the disclosed embodiments.

Duct burner systems configured to utilize low BTU fuel sources are provided in the disclosed embodiments. In certain embodiments, the systems may include a primary duct configured to receive a primary flow stream of exhaust gases from an exhaust duct and a secondary duct configured to receive a secondary flow stream of exhaust gases from the exhaust duct. Primary and secondary variable geometry diverters may be configured to allow and restrict the primary and secondary flow streams, respectively. A combustion system may receive the secondary flow stream, combine it with at least one low BTU fuel source, combust for heating the secondary flow stream, and re-inject the heated secondary flow stream into the primary duct. A blower may be used to blow the secondary flow stream through the combustion system. In addition, a system controller may be used to control the stoichiometric flow ratio of the secondary flow stream by actuating the primary and secondary variable geometry diverters.

Figure 1:
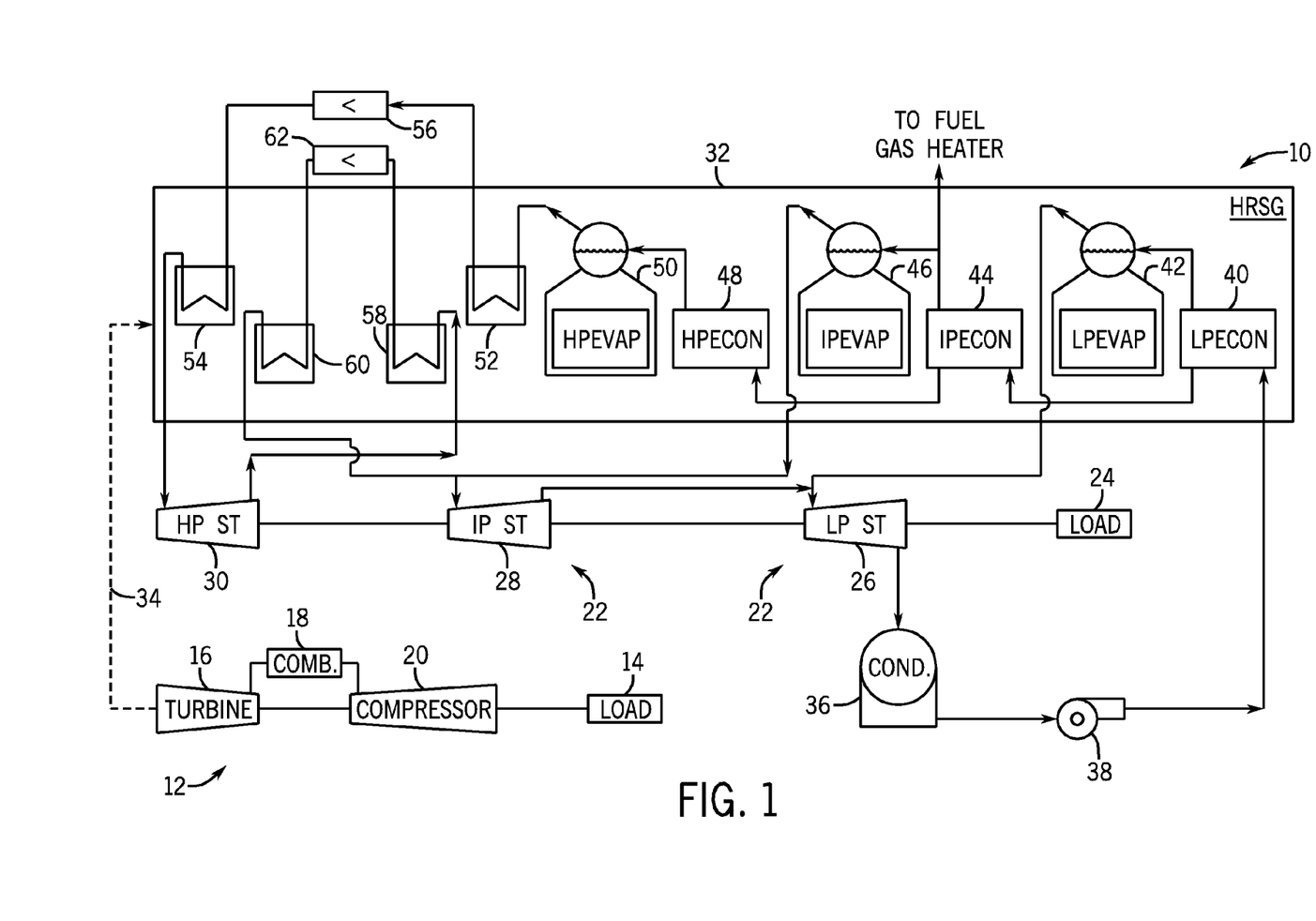
FIG. 1 is a schematic flow diagram of an exemplary combined cycle power generation system which may utilize the duct burner systems and methods of the disclosed embodiments.

FIG. 1 is a schematic flow diagram of an exemplary combined cycle power generation system 10 which may utilize the duct burner systems and methods of the disclosed embodiments. The system 10 may include a gas turbine 12 for driving a first load 14. The first load 14 may, for instance, be an electrical generator for producing electrical power. The gas turbine 12 may include a turbine 16, a combustor or combustion chamber 18, and a compressor 20. The system 10 may also include a steam turbine 22 for driving a second load 24. The second load 24 may also be an electrical generator for generating electrical power. However, both the first and second loads 14, 24 may be other types of loads capable of being driven by the gas turbine 12 and steam turbine 22. In addition, although the gas turbine 12 and steam turbine 22 may drive separate loads 14 and 24, as shown in the illustrated embodiment, the gas turbine 12 and steam turbine 22 may also be utilized in tandem to drive a single load via a single shaft. In the illustrated embodiment, the steam turbine 22 may include one low-pressure stage 26 (LP ST), one intermediate-pressure stage 28 (IP ST), and one high-pressure stage 30 (HP ST). However, the specific configuration of the steam turbine 22, as well as the gas turbine 12, may be implementation-specific and may include any combination of stages.

The system 10 may also include a multi-stage HRSG 32. The components of the HRSG 32 in the illustrated embodiment are a simplified depiction of the HRSG 32 and are not intended to be limiting. Rather, the illustrated HRSG 32 is shown to convey the general operation of such HRSG systems. Heated exhaust gas 34 from the gas turbine 12 may be transported into the HRSG 32 and used to heat steam used to power the steam turbine 22. Exhaust from the low-pressure stage 26 of the steam turbine 22 may be directed into a condenser 36. Condensate from the condenser 36 may, in turn, be directed into a low-pressure section of the HRSG 32 with the aid of a condensate pump 38.

The condensate may then flow through a low-pressure economizer 40 (LPECON), which is a device configured to heat feedwater with gases, may be used to heat the condensate. From the low-pressure economizer 40, the condensate may either be directed into a low-pressure evaporator 42 (LPEVAP) or toward an intermediate-pressure economizer 44 (IPECON). Steam from the low-pressure evaporator 42 may be returned to the low-pressure stage 26 of the steam turbine 22. Likewise, from the intermediate-pressure economizer 44, the condensate may either be directed into an intermediate-pressure evaporator 46 (IPEVAP) or toward a high-pressure economizer 48 (HPECON). In addition, steam from the intermediate-pressure economizer 44 may be sent to a fuel gas heater (not shown) where the steam may be used to heat fuel gas for use in the combustion chamber 18 of the gas turbine 12. Steam from the intermediate-pressure evaporator 46 may be sent to the intermediate-pressure stage 28 of the steam turbine 22. Again, the connections between the economizers, evaporators, and the steam turbine 22 may vary across implementations as the illustrated embodiment is merely illustrative of the general operation of an HRSG system that may employ unique aspects of the present embodiments.

Finally, condensate from the high-pressure economizer 48 may be directed into a high-pressure evaporator 50 (HPEVAP). Steam exiting the high-pressure evaporator 50 may be directed into a primary high-pressure superheater 52 and a finishing high-pressure superheater 54, where the steam is superheated and eventually sent to the high-pressure stage 30 of the steam turbine 22. Exhaust from the high-pressure stage 30 of the steam turbine 22 may, in turn, be directed into the intermediate-pressure stage 28 of the steam turbine 22. Exhaust from the intermediate-pressure stage 28 of the steam turbine 22 may be directed into the low-pressure stage 26 of the steam turbine 22.

An inter-stage attemperator 56 may be located in between the primary high-pressure superheater 52 and the finishing high-pressure superheater 54. The inter-stage attemperator 56 may allow for more robust control of the exhaust temperature of steam from the finishing high-pressure superheater 54. Specifically, the inter-stage attemperator 56 may be configured to control the temperature of steam exiting the finishing high-pressure superheater 54 by injecting cooler feedwater spray into the superheated steam upstream of the finishing high-pressure superheater 54 whenever the exhaust temperature of the steam exiting the finishing high-pressure superheater 54 exceeds a predetermined value.

In addition, exhaust from the high-pressure stage 30 of the steam turbine 22 may be directed into a primary re-heater 58 and a secondary re-heater 60 where it may be re-heated before being directed into the intermediate-pressure stage 28 of the steam turbine 22. The primary re-heater 58 and secondary re-heater 60 may also be associated with an inter-stage attemperator 62 for controlling the exhaust steam temperature from the re-heaters. Specifically, the inter-stage attemperator 62 may be configured to control the temperature of steam exiting the secondary re-heater 60 by injecting cooler feedwater spray into the superheated steam upstream of the secondary re-heater 60 whenever the exhaust temperature of the steam exiting the secondary re-heater 60 exceeds a predetermined value.

In combined cycle systems such as system 10, hot exhaust may flow from the gas turbine 12 and pass through the HRSG 32 and may be used to generate high-pressure, high-temperature steam. The steam produced by the HRSG 32 may then be passed through the steam turbine 22 for power generation. In addition, the produced steam may also be supplied to any other processes that use superheated steam. The gas turbine 12 generation cycle is often referred to as the "topping cycle," whereas the steam turbine 22 generation cycle is often referred to as the "bottoming cycle." By combining these two cycles as illustrated in FIG. 1, the combined cycle power generation system 10 may lead to greater efficiencies in both cycles. In particular, exhaust heat from the topping cycle may be captured and used to generate steam for use in the bottoming cycle.

Therefore, in combined cycle systems such as system 10, it is desirable to capture thermal energy from the topping cycle, which might otherwise be wasted, and use the thermal energy to generate power in the bottoming cycle. As the exhaust temperature from the gas turbine 12 into the HRSG 32 is increased, the amount of thermal energy available to be recaptured by the HRSG 32 is increased as well. This, in turn, allows for greater overall efficiencies of the combined cycle system 10. Many techniques for increasing the exhaust temperature into the HRSG 32 may be utilized including, but not limited to, the use of duct burners in between the gas turbine 12 and the HRSG 32. The use of duct burners to increase the temperature of the exhaust 34 from the gas turbine 12 does not necessarily increase the overall efficiency of the system 10 if a supplementary fuel source is used as an input into the duct burner. However, duct burners may allow for greater steam production and, in turn, greater power production during periods of peak loading of the system 10. Furthermore, as set forth below, if available low BTU fuel is used in the duct burners, rather than a supplemental fuel source, then the overall efficiency may increase by using the otherwise wasted low BTU fuel.

A low BTU fuel source is intended to mean a fuel that has lower calorific value than conventional gaseous, liquid, or solid fuels (e.g., methane) but which has a calorific value that is high enough to create a combustible mixture and allow continuous burning. Low BTU fuels may be characterized as having a calorific range between 90 and 700 Btu/scf (British thermal units per standard cubic feet). The calorific value is a fuel property that defines the amount of heat released when burned. Low BTU fuels may have a higher concentration of constituents with no or low calorific value (e.g., carbon monoxide, carbon dioxide, nitrogen, and so forth).

Figure 2:
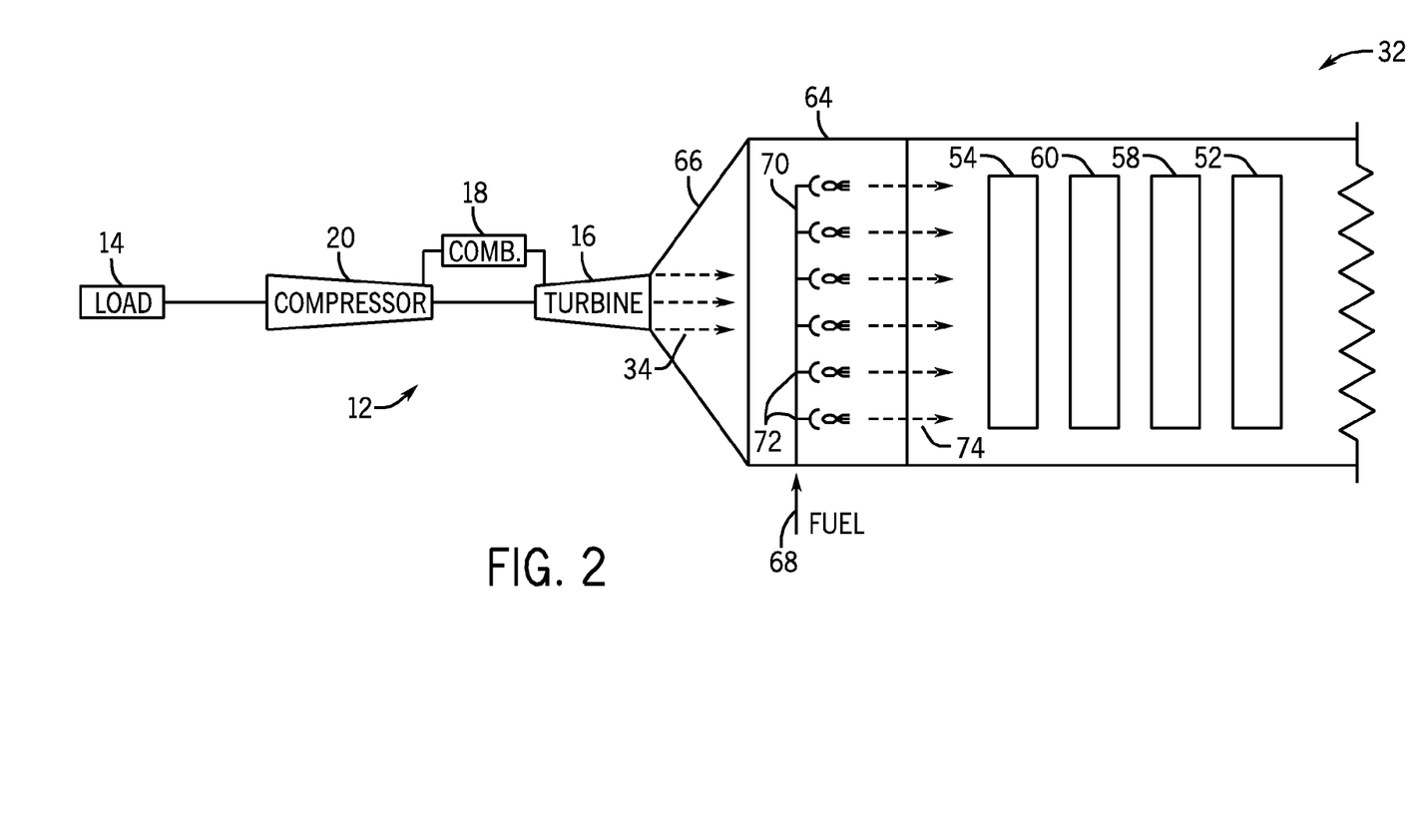
FIG. 2 is a schematic diagram of an exemplary operation of a gas turbine, HRSG, and duct burner illustrating basic principles that may be used in accordance with the disclosed embodiments.

FIG. 2 is a schematic diagram of an exemplary operation of a gas turbine 12, HRSG 32, and duct burner 64 illustrating basic principles that may be used in accordance with the disclosed embodiments. As discussed above, the exhaust 34 from the gas turbine 12 may be directed into the HRSG 32 where heat from the exhaust 34 may be used to convert condensate from the bottoming cycle into superheated steam in the bottoming cycle. As the exhaust 34 exits that gas turbine 12, it may be gradually expanded through an exhaust duct 66 before reaching the duct burner 64. The exhaust 34 may be mixed with a supplementary fuel source 68 (e.g., a low BTU fuel) which may be injected into the stream of the exhaust 34 via a duct burner 70 with associated injectors 72. Once the exhaust 34 is fired via the duct burner 70, the resulting superheated exhaust 74 may be used to superheat steam via the finishing high-pressure superheater 54, the secondary re-heater 60, the primary re-heater 58, the primary high-pressure superheater 52, and other components of the HRSG 32.

Since the gas turbine 12 may generally consume only a small amount of available oxygen within the gas turbine air flow, the exhaust 34 may generally contain a high percentage of oxygen which allows for the supplemental firing in the duct burner 64. A supplementary fuel source 68 having a relatively high BTU content may be beneficial for flame stability, yet it may not be an available product at a facility. In other words, the facility may not produce high BTU fuel, and thus its use would add cost and lower efficiency of the facility. In contrast, low BTU fuels may be more difficult to burn in a duct due to low equivalence ratio and flame stability problems, yet the low BTU fuels may be an available product of the facility. Thus, use of these available low BTU fuels may improve overall efficiency of the facility.

The disclosed embodiments provide a variety of techniques to enable use of low BTU fuels in a controlled and stable manner, thereby increasing efficiency in the facility. In order to burn a low BTU fuel in the duct burning equipment of the disclosed embodiments, the supplementary fuel source 68 may be blended with a fuel having a higher heating value (e.g. natural gas), resulting in a higher mixed fuel heating value so that a more combustible mixture may result. The exhaust 34 may be diverted so that only a portion of the exhaust 34 may be used for burning. For example, a proportioning flow control system may prevent the combustible mixture from becoming diluted below lean flammability limits for stable burning operation.

Burning low BTU fuel sources within duct burners may avoid venting, flaring, or burning the low BTU fuel sources, which may otherwise be viewed as relatively useless byproducts of the combined cycle power generation system 10. Therefore, in this respect, burning low BTU fuel sources may allow for more efficiency. The disclosed embodiments allow for efficient burning of low BTU fuels within a duct burner. It should be noted that while the disclosed embodiments are directed toward the use of low BTU fuels, the disclosed embodiments may also prove useful for application with any other fuels which are not easily combustible within conventional duct burner systems (e.g., high-oxygen gas, landfill gas, and so forth). The disclosed embodiments may allow for the burning of such non-conventional fuels, as well as solids, mixtures, and so forth. Indeed, the disclosed embodiments may be extended for use with all fuels, including conventional fuels.

Figure 3:
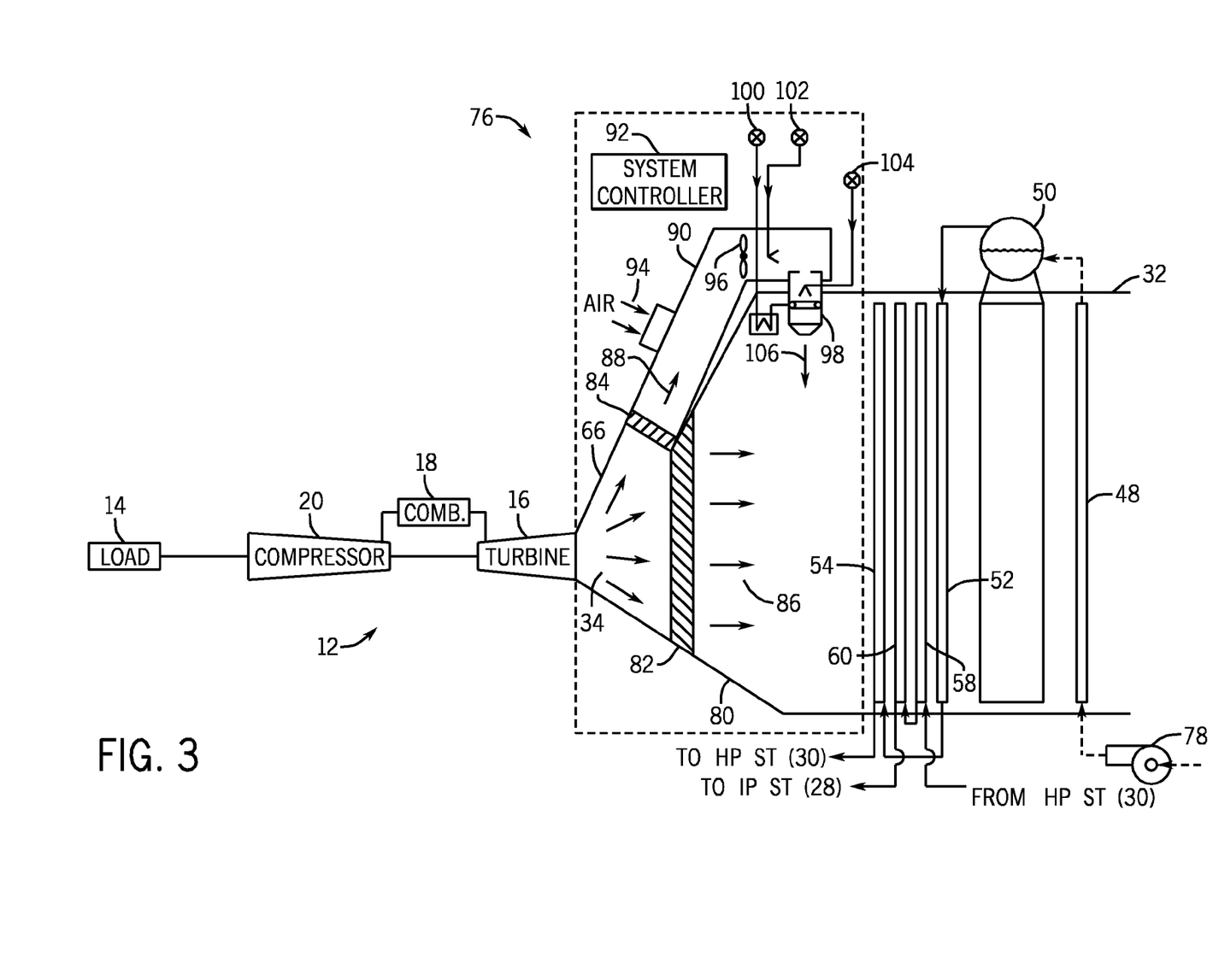
FIG. 3 is a schematic diagram of an exemplary duct burner system as used with a gas turbine and HRSG in accordance with the disclosed embodiments.

FIG. 3 is a schematic diagram of an exemplary duct burner system 76 as used with a gas turbine 12 and HRSG 32 in accordance with the disclosed embodiments. In the illustrated embodiment, a feedwater pump 78 may pump feedwater to the high-pressure economizer 48 for heating and then to the high-pressure evaporator 50 where the steam may be separated from the condensate. The high-pressure steam may then be directed into the primary high-pressure superheater 52 and finishing high-pressure superheater 54 where it is superheated before being directed into the high-pressure stage 30 of the steam turbine 22. After being used in the high-pressure stage 30 of the steam turbine 22, the steam may be returned to the HRSG 32 where it may be re-heated by the primary re-heater 58 and secondary re-heater 60. Once being re-heated by the re-heaters, the steam may be directed into the intermediate-pressure stage 28 of the steam turbine 22. As mentioned above, these illustrated interactions between the HRSG 32 and the steam turbine 22 are merely intended to be illustrative and should not be construed as limiting. In particular, these interconnections are merely used for the purpose of illustrating how steam may travel through the HRSG 32 and interact with exhaust 34 from the gas turbine 12 after the exhaust 34 has passed through an exemplary duct burner system 76 utilizing the disclosed embodiments.

The exhaust 34 from the gas turbine 12 may generally flow into the exhaust duct 66 where it gradually expands and then flows into a primary duct 80. In the primary duct 80, the exhaust 34 may further expand and be heated before flowing through the HRSG 32 for generating the superheated steam used to power the steam turbine 22. In the illustrated embodiment, the exhaust 34 may be split into two parallel flow streams by a primary diverter 82 and a secondary diverter 84. A primary flow stream 86 may be allowed through the primary duct 80 while a secondary flow stream 88 may be diverted into a secondary duct 90. In particular, the primary diverter 82 may be configured to allow or restrict the primary flow stream 86 into the primary duct 80, while the secondary diverter 84 may be configured to allow or restrict the secondary flow stream 88 into the secondary duct 90. Therefore, the two flow streams 86, 88 may be separated into separate ducts 80, 90, rather than maintaining all flow within a single common duct between the exhaust duct 66 and the HRSG 32. In the disclosed embodiments, the duct burning may be accomplished as part of the secondary duct 90, as opposed to the primary duct 80 or a single common duct.

One or both of the diverters 82, 84 may be characterized as having a variable geometry for diverting flow between the flow streams 86, 88. The variable geometry of the diverters 82, 84 may be achieved through many different designs and may include, for example, a louvered diverter damper or converging/diverging nozzle arrangement. The use of variable geometry diverter mechanisms is quite different than duct burner systems having fixed geometry diverter mechanisms. Using variable geometry diverter mechanisms may allow for stable duct burning throughout a broader range of operating conditions than with fixed geometry diverter mechanisms. In particular, using variable geometry diverter mechanisms, the rate of diversion may be modified over time to take into account changes in operating conditions and, more specifically, changes in the stoichiometric makeup of the exhaust 34 from the gas turbine 12. The primary and secondary ducts 80, 90 may also be designed as any suitable geometry and may include circular, square, or rectangular cross sections.

The diverters 82, 84 may be equipped with an actuation system that may change the positioning of the diverters 82, 84 and other associated diverter mechanisms. The actuation system may interact with a system controller 92 to change the diverter 82, 84 positioning, thereby controlling the amount or portion of the exhaust 34 being diverted into the primary flow stream 86 and the secondary flow stream 88. The system controller 92 may be configured to change the stoichiometric flow ratio between the low BTU fuel stream and the secondary flow stream 88 based on the constituents of each stream. In addition, a supplementary air stream 94 may be introduced into the secondary flow stream 88 through an opening in the secondary duct 90. The supplementary air stream 94 may change the stoichiometric properties of the secondary flow stream 88. The flow diversion process may also be enhanced by using a blower 96. The blower 96 may promote a pre-mixing combustion method and eliminate implementation of a pilot flame technique as a continuous ignition source. In addition, the blower 96 may be used to adjust the velocity of the secondary flow stream 88, such that the firing of the duct burner system 76 may be more stable.

The secondary flow stream 88 may be directed into a combustion system 98 for heating. The combustion system 98 may include a multitude of combustion system features, such as fuel, diluent, and oxidant injection nozzles, pre-mixing features, flame detection, ignition system, combustion process control, and so forth. For example, as illustrated, the combustion system 98 may be supplemented by a heated air or heated oxidant system 100 where a stream of air or oxidant may be heated by the elevated temperatures of the combustion by-products and then introduced into the combustion chamber of the combustion system 98. The heated air or heated oxidant may be admitted into the combustion chamber in a location where it may heat the combustible mixture to optimal combustion reaction temperatures for promoting flame stability. Thus, the heated air or heated oxidant system 100 may act as an auto-ignition system, instead of using piloting techniques. Using the heated air or oxidant system 100 as an auto-ignition system may lead to thermodynamic efficiency benefits. In addition, the techniques used by the heated air or heated oxidant system 100 may be used in other combustion systems of the combined cycle power generation system 10, such as the combustion chamber 18 of the gas turbine 12. The location used for heating the air or oxidant within the primary flow stream 86 may vary and may be dependent upon the optimal temperature of the heated air or heated oxidant entering the combustion system 98.

The combustion system 98 may also be supplemented by a diluent and/or oxygen enrichment system 102 upstream of the combustion system 98. As discussed above, a low BTU fuel mixture 104 may be introduced into the combustion system 98. The resulting flame created in the combustion chamber of the combustion system 98 may result in a heated flow stream 106 for mixture with the primary flow stream 86 in an area of the primary duct 80 which may be referred to as the heating zone. A flow ratio control strategy may be utilized to control the stoichiometric ratio between flue gas, air or other fluid mediums and the low BTU fuel.

The disclosed duct burner techniques may be applied to many applications but are particularly well-suited to application just downstream of the exhaust duct 66 of a gas turbine 12 and upstream of an HRSG 32, as illustrated in FIG. 3. As described above, the disclosed embodiments may prove especially beneficial when controlling the stoichiometric flow ratio for the exhaust 34 over a wide range of operating conditions. The duct burner system 76 may be configured with either single or multiple combustion chambers based on the range of intended duct burner system 76 operation. The combustion system 98 may also accept multiple fuel streams, including ultra-low BTU fuels (e.g., tail gases) where the fuel streams may be premixed with other steams before or during entering the combustion system 98.

An ultra low BTU fuel source is intended to mean a fuel having a calorific range below approximately 90 Btu/scf. An ultra low BTU fuel source is a fuel that has a calorific value that is so low that a combustible mixture may not be achievable. To produce a heat release by burning the ultra low BTU fuel, the ultra low BTU fuel may be combusted with a fuel source having a higher calorific value.

Additional features may also be added to the duct burner system 76, namely within the functions of the system controller 92. For example, the stoichiometric flow ratio may be controlled by the system controller 92 based on emissions monitoring. In other words, emissions from the duct burner system 76 may be monitored and, based on changes in the emissions, the system controller 92 may modify the flow and composition of the secondary flow stream 88 and resultant combustible mixture. In addition, a re-circulation loop for the low BTU fuel mixture 104 may be added without adversely affecting the overall combustion process. Monitoring and diagnostics systems, such as thermography, may also be added to the disclosed embodiments. The system controller 92 may also vary process control parameters of the subsystems contained within the disclosed embodiments, including the supplementary air stream 94, blower 96, heated air or heated oxidant system 100, oxygen enrichment system 102, low BTU fuel mixture 104, combustion system 98, and heated flow stream 106. The duct burner system 76 may enable operational integration such that the system controller 92 may be utilized to interact with the gas turbine 12, HRSG 32, and even controllers of the combined cycle power generation system 10 facility.

Figure 4:
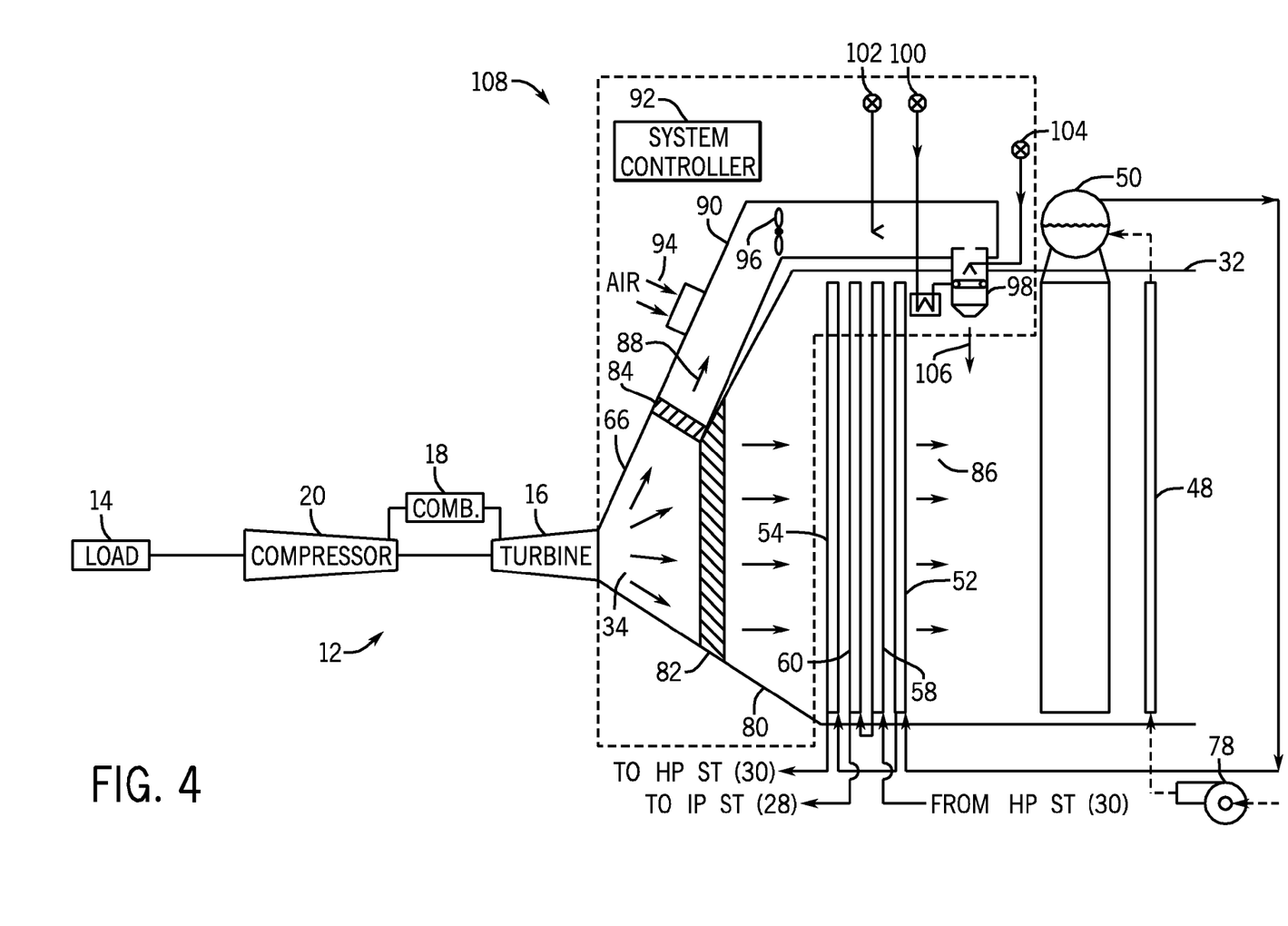
FIG. 4 is a schematic diagram of another exemplary duct burner system as used with a gas turbine and HRSG in accordance with the disclosed embodiments.

FIG. 4 is a schematic diagram of another exemplary duct burner system 108 as used with a gas turbine 12 and HRSG 32 in accordance with the disclosed embodiments. Most of the components of the duct burner system 108 illustrated in FIG. 4 are similar to those used in the duct burner system 76 illustrated in FIG. 3. However, the duct burner system 108 of FIG. 4 shows how various designs may be implemented using the present duct burning techniques. For instance, in FIG. 4, the combustion system 98 may be placed downstream of certain components of the HRSG 32. In particular, in the illustrated embodiment, the combustion system 98 may be placed downstream of the primary high-pressure superheater 52, finishing high-pressure superheater 54, primary re-heater 58, and secondary re-heater 60 of the HRSG 32. As such, the heated flow stream 106 may be introduced into the primary flow stream 86 in an area of the primary duct 80 downstream of these superheating and re-heating components of the HRSG 32. Doing so may allow the heated flow stream 106 to mix with the primary flow stream 86 resulting in the primary flow stream 86 entering the high-pressure evaporator 50

(HPEVAP) at much higher temperatures. The effect of this delayed mixing may vary among differing operating conditions. However, the increased temperatures into the high-pressure evaporator 50 (HPEVAP) of the HRSG 32 may generally enable increased and more efficient production of superheated steam within the HRSG 32.

Therefore, FIG. 4 illustrates how duct burner systems using the disclosed embodiments may be configured in various ways. In addition, the present duct burner systems may be designed as part of different systems. For instance, the duct burner systems may be integrated into the exhaust of the gas turbine 12, various locations along the HRSG 32, or some combination thereof, as illustrated in FIGS. 3 and 4. In particular, the duct burner systems may be designed as modules, which may be inserted into the HRSG 32. Therefore, the disclosed embodiments may include modular duct burners, retrofit kits, integrated ducts, and so forth. Regardless of the specific spatial configuration chosen for the duct burner systems, the method of operation used may be substantially similar.

Figure 5:
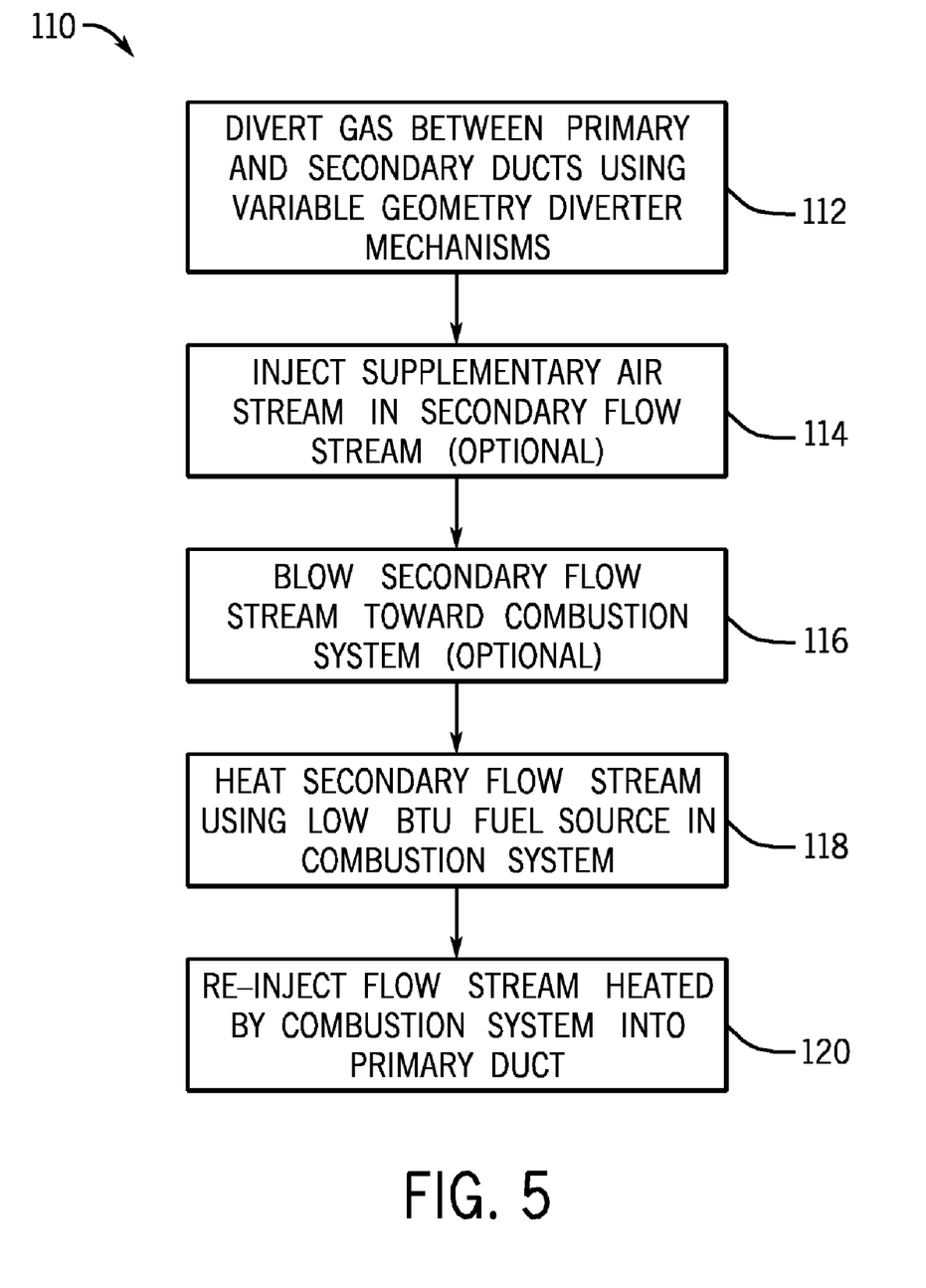
FIG. 5 is a flow chart of an exemplary method for duct burning low BTU fuel sources using the disclosed embodiments.

FIG. 5 is a flow chart of an exemplary method 110 for duct burning low BTU fuel sources using the disclosed embodiments. At step 112, gas may be diverted between the primary duct 80 and the secondary duct 90 using variable geometry diverter mechanisms. As described throughout the present disclosure, the gas may be the exhaust 34 from the gas turbine 12. However, the method 110 for duct burning low BTU fuel sources may also be utilized in other applications where gases may be used to fire duct burning systems. As described above, the variable geometry mechanisms may include the primary diverter 82 and the secondary diverter 84, wherein the primary diverter 82 may allow or restrict the gas from flowing into the primary duct 80 and the secondary diverter 84 may allow or restrict the gas from flowing into the secondary duct 90. In general, step 112 may include actuating the positioning of the diverters 82, 84 based on control instructions received by the system controller 92. The system controller 92 may control the stoichiometric flow ratio between the low BTU fuel mixture 104 and the secondary flow stream 88. Controlling the flow and composition of the respective flow streams 88, 104 may allow for, among other things, suitable stoichiometric conditions in the combustion system 98.

The system controller 92 may also control other stoichiometric parameters. For instance, at step 114, the supplementary air stream 94 may optionally be injected into the secondary flow stream 88. In addition, at step 116, the secondary flow stream 88 may optionally be blown through the combustion system 98 by the blower 96. The system controller 92 may also manipulate various other fuel controls to optimize the stoichiometric flow ratio of the secondary flow stream 88 for optimal combustion. For instance, the heated air or oxidant system 100, diluent and/or oxygen enrichment system 102, and other appropriate systems may be controlled by the system controller 92 to inject supplementary air and gases into the secondary flow stream 88 to ensure that the low BTU fuel mixture 104 may be capable of producing stable flames in the combustion system 98.

At step 118, the secondary flow stream 88 may be combined with the low BTU fuel mixture 104 to produce flames in the combustion chamber of the combustion system 98, resulting in the heated flow stream 106. At step 120, the heated flow stream 106 may then be re-injected by the combustion system 98 into the primary duct 80 where it may mix with the primary flow stream 86.

Duct firing low BTU fuel may allow facilities to burn excess process fuels that may not otherwise be consumed by the gas turbine for steam generation purposes. As such, the disclosed embodiments may allow for the burning of all available fuel sources produced at a given facility. This may enable a more flexible plant design approach for optimizing gas turbine and steam turbine output capacity. In addition, duct burner systems using the disclosed embodiments may also be considered reserve capacity in the event that other low BTU fuel burning equipment failures occur. Duct firing may also raise the gas turbine exhaust temperature, promoting a more efficient reheat steam cycle. The disclosed embodiments may also be used in response to both emergency and upset conditions such as electrical frequency response and loss of steam production from an adjacent steam generator. Furthermore, the additional steam generation produced from duct firing may be re-introduced to the gas turbine cycle for both emissions control and power augmentation.

The present duct burning techniques use a combination of blowers, variable geometry diverters, and fuel controls to optimize the stoichiometric flow ratio for optimal combustion reactions in duct firing applications. Whereas other duct burning systems may use a single adiabatic furnace, the disclosed embodiments may use a single or multiple combustion chambers. In addition, whereas other duct burning systems may use a heated refractory to optimize the temperature of the combustible mixture, the disclosed embodiments may introduce heated air or oxidant into the combustion chamber of the combustion system 98 to increase the temperature of the combustible mixture. As described above, the disclosed embodiments also introduce a blower 96 to promote a pre-mixing combustion strategy, whereas other duct burning systems may require a pilot flame combustion strategy.

The present duct burner systems are not limited to being an integral equipment package contained internally within a duct. Rather, they may constitute an equipment package which may be inserted into a duct from an exterior surface to allow access for operational diagnostics and maintenance. The disclosed embodiments allow for greater flexibility with respect to the equipment arrangement and orientation because multiple combustion chambers may be installed and oriented to optimize the heat recovery design. In addition, the disclosed embodiments may create a heating zone with uniform temperature distribution to mitigate thermally induced mechanical strain. The present duct burner systems may also be configured to allow a staging strategy. For example, when power or steam demand increases, different combustion systems may be turned "ON" or "OFF" to meet the demand. This staging strategy may also apply for changes in fuel supply.

The low BTU fuel duct burning techniques presented herein may be applied to any combined cycle gas turbine to add heat to an HRSG. The techniques may also be applied in many steam generation boiler or heat exchanger applications. In particular, the disclosed embodiments may be applied to gas turbine heat recovery systems in the area of synthetic gas production, steel mill blast furnace, and gas and refinery facilities. Duct burning systems using the disclosed embodiments may also be used in existing gas turbine combined cycle applications.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:
1. A system, comprising:
an exhaust duct configured to receive exhaust gases from a gas turbine;

a primary duct configured to receive a primary flow stream of the exhaust gases from the exhaust duct;

a secondary duct configured to receive a secondary flow stream of the exhaust gases from the exhaust duct;

a primary variable geometry diverter configured to allow and restrict the primary flow stream into the primary duct;

a secondary variable geometry diverter configured to allow and restrict the secondary flow stream into the secondary duct;

a combustion system configured to combine the secondary flow stream with at least one fuel source, to combust the secondary flow stream, and to re-inject the heated secondary flow stream into the primary duct;

a blower configured to blow the secondary flow stream through the combustion system; and a controller configured to control the stoichiometric flow ratio between the fuel source and the secondary flow stream by actuating the primary and secondary variable geometry diverters.

2. The system of claim 1, comprising a gas turbine coupled to the exhaust duct, wherein the exhaust gases are generated by the gas turbine.

3. The system of claim 1, comprising a heat recovery steam generation system configured to receive the heated secondary flow stream from the primary duct.

4. A system, comprising:

a variable geometry diverter configured to operate in a path of exhaust gas from a gas turbine to a heat recovery steam generation system, wherein the variable geometry diverter comprises:

a primary diverter configured to allow and restrict flow of the exhaust gas into the primary exhaust path; and a secondary diverter configured to allow and restrict flow of the exhaust gas into the secondary exhaust path; and a combustion system configured to combine the exhaust gas in the secondary exhaust path with at least one fuel source, to combust the exhaust gas in the secondary exhaust path, and to re-inject the heated gas radially inward into the primary exhaust path.

5. The system of claim 4, comprising a blower configured to blow the exhaust gas in the secondary exhaust path through the combustion system.

6. The system of claim 4, comprising a controller configured to control a flow and composition of the exhaust gas in the secondary exhaust path based on a stoichiometric flow ratio between the at least one fuel source and the exhaust gas in the secondary exhaust path.

7. The system of claim 6, wherein the controller is configured to control the flow and composition of the exhaust gas in the secondary exhaust path by actuating the variable geometry diverter.

8. The system of claim 6, wherein the controller is configured to control the flow and composition of the exhaust gas in the secondary exhaust path based on emissions from the combustion system.

9. The system of claim 4, comprising a supplementary air injector configured to add air into the exhaust gas in the secondary exhaust path.

10. The system of claim 4, comprising a heated air or heated oxidant system configured to add heated air or other oxidants into the exhaust gas in the secondary exhaust path.

11. The system of claim 4, wherein the variable geometry diverter comprises louvered diverter dampers, converging/diverging nozzle arrangements, or a combination thereof.

12. The system of claim 4, comprising a modular unit configured to mount in a duct between the gas turbine and the heat recovery steam generation system, wherein the modular unit comprises the variable geometry diverter, the primary exhaust path, the secondary exhaust path, the combustion system, or a combination thereof.

13. The system of claim 4, comprising a retrofit kit, wherein the retrofit kit comprises the variable geometry diverter, the primary exhaust path, the secondary exhaust path, the combustion system, or a combination thereof.

14. A method, comprising:

diverting exhaust gas from a gas turbine engine between a primary duct and a secondary duct of using variable geometry primary and secondary diverters, wherein a primary flow stream is diverted into the primary duct and a secondary flow stream is diverted into the secondary duct;

heating the secondary flow stream in a combustion system using a fuel to combust in the combustion system to produce a combustion flow stream; and re-injecting the combustion flow stream radially inward from the combustion system into the primary duct.

15. The method of claim 14, comprising controlling a position of the variable geometry primary and secondary diverters.

16. The method of claim 15, comprising controlling the primary and secondary flow streams based on a stoichiometric flow ratio between the fuel and the secondary flow stream.

17. The method of claim 14, comprising injecting a supplementary air stream into the secondary flow stream.

18. The method of claim 14, comprising blowing the secondary flow stream through the combustion system.

19. The method of claim 14, comprising adding heated air or heated oxidant to the secondary flow prior to combustion of the fuel.

* * * * *